United States Patent
Cormode et al.

(10) Patent No.: US 7,657,503 B1
(45) Date of Patent: Feb. 2, 2010

(54) SYSTEM AND METHOD FOR GENERATING STATISTICAL DESCRIPTORS FOR A DATA STREAM

(75) Inventors: Graham Cormode, Summit, NJ (US); Phillip Korn, New York, NY (US); Shanmugavelayutham Muthukrishnan, Washington, DC (US); Divesh Srivastava, Summit, NJ (US)

(73) Assignee: AT&T Corp., New York, NY (US)

( * ) Notice: Subject to any disclaimer, the term of this patent is extended or adjusted under 35 U.S.C. 154(b) by 449 days.

(21) Appl. No.: 11/288,793

(22) Filed: Nov. 29, 2005

(51) Int. Cl.
*G06F 17/30* (2006.01)
(52) U.S. Cl. .............................. 707/2; 707/4
(58) Field of Classification Search ...................... 707/6, 707/101, 104.1, 2, 3, 4, 5, 10
See application file for complete search history.

(56) References Cited

U.S. PATENT DOCUMENTS

| | | | |
|---|---|---|---|
| 5,995,957 A * | 11/1999 | Beavin et al. | ................... 707/2 |
| 6,205,447 B1 | 3/2001 | Malloy | |
| 6,272,487 B1 * | 8/2001 | Beavin et al. | ................... 707/2 |
| 6,484,179 B1 | 11/2002 | Roccaforte | |
| 6,636,870 B2 | 10/2003 | Roccaforte | |
| 6,643,613 B2 | 11/2003 | McGee et al. | |
| 6,836,773 B2 | 12/2004 | Tamayo et al. | |
| 6,947,586 B2 | 9/2005 | Kasdan et al. | |

* cited by examiner

*Primary Examiner*—Jean M Corrielus
(74) *Attorney, Agent, or Firm*—Fay Kaplun & Marcin, LLP

(57) ABSTRACT

Described is a system and method for receiving a data stream of multi-dimensional items, collecting a sample of the data stream having a predetermined number of items and dividing the sample into a plurality of subsamples, each subsample corresponding to a single dimension of each of the predetermined number of items. A query is then executed on a particular item in at least two of the subsamples to generate data for the corresponding subsample. This data is combined into a single value.

10 Claims, 3 Drawing Sheets

SYSTEM AND METHOD FOR GENERATING STATISTICAL DESCRIPTORS FOR A DATA STREAM

BACKGROUND

Database management systems are designed to process and manage massive "streams" of data which arrive at a very high rate. Due to resource constraints (e.g., limited memory, processing time), it becomes difficult to "read" each new update to the stream, much less store and process the update. This problem is conventionally seen in analyzing IP network traffic data. For example, new packets arrive at routers at very high rates from hundreds of thousands to many millions every second. Network operators desire that stream summarizing, such as data distribution, trending and mining for anomalous behavior, occur in real time. However, space available to process the data stream is typically considerably smaller than the stream. In some cases, when processing, the space used grows linearly with an input size (e.g., a portion of the stream), rapidly filling the space available. Thus, an analysis algorithm may not fully execute because the space is totally occupied. Summarizing, though, is essential for substantially every aspect of network management, including billing, verifying service level agreements and network security.

Typical summarizing methods use one-dimensional descriptors such as quantiles (e.g., a median=½ quantile) to describe a customer's network. For example, rather than provide an average delay or throughput on the IP network for the customer, the network operator provides the quantiles of delay and throughput of data flows associated with the customer to describe more robustly a quality of service provided to the customer. However, data streams typically represent multidimensional data which cannot effectively be described using the one-dimensional quantiles.

SUMMARY OF THE INVENTION

A method for receiving a data stream of multi-dimensional items, collecting a sample of the data stream having a predetermined number of items and dividing the sample into a plurality of subsamples, each subsample corresponding to a single dimension of each of the predetermined number of items. A query is then executed on a particular item in at least two of the subsamples to generate data for the corresponding subsample. This data is combined into a single value A system having a computing network and a router receiving a data stream of multi-dimensional items from the computing network, the router collecting a sample of the data stream having a predetermined number of items, the router dividing the sample into a plurality of subsamples, each subsample corresponding to a single dimension of each of the predetermined number of items, the router executing a query on a particular item in at least two subsamples to generate data for the corresponding subsample and combining the data into a single value.

A computer readable storage medium including a set of instructions executable by a processor. The set of instructions being operable to receive a data stream of multi-dimensional items, collect a sample of the data stream having a predetermined number of items, divide the sample into a plurality of subsamples, each subsample corresponding to a single dimension of each of the predetermined number of items, execute a query on a particular item in at least two of the subsamples to generate data for the corresponding subsample and combine the data into a single value.

BRIEF DESCRIPTION OF THE DRAWINGS

FIG. 3($b$) shows another exemplary embodiment of the sample shown in FIG. 3$a$.

FIG. 4($b$) shows an exemplary embodiment of a two-dimensional data structure with slivers in one of the dimensions according to the present invention.

FIG. 4($c$) shows an exemplary embodiment of a one-dimensional data structure according to the present invention.

FIG. 5($b$) shows another exemplary embodiment of an isoquantile plot according to the present invention.

DETAILED DESCRIPTION

Figure 1:
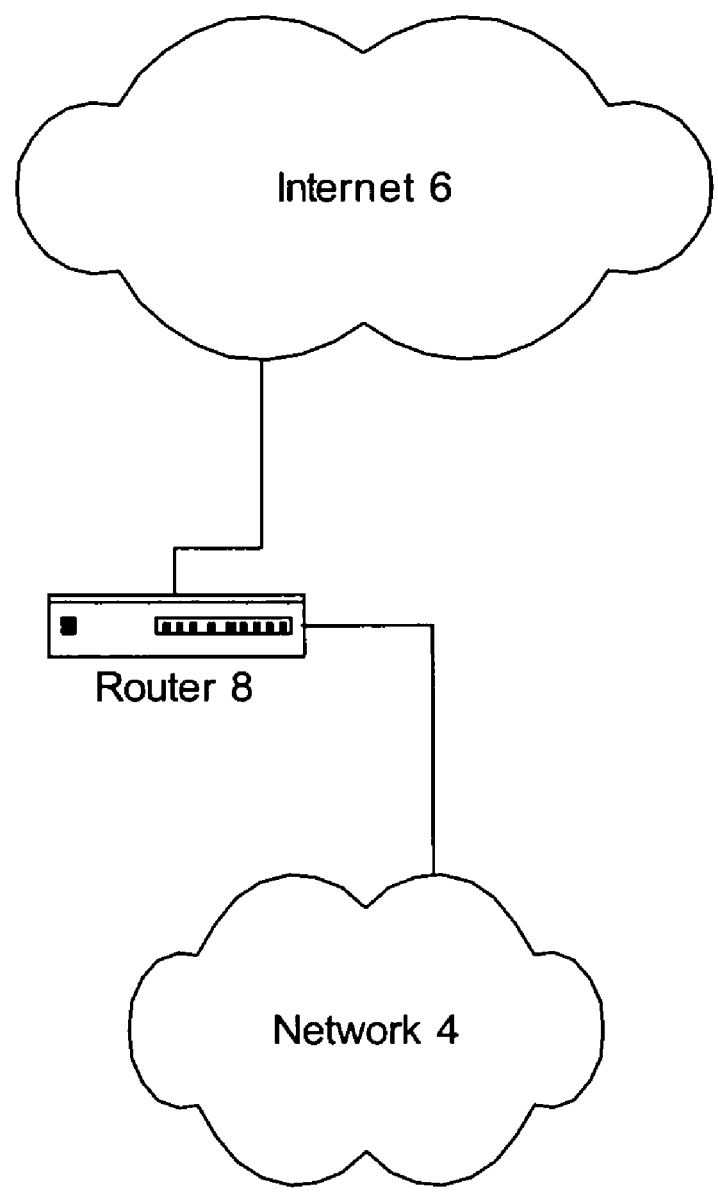
FIG. 1 shows an exemplary embodiment of a system according to the present invention.

The present invention may be further understood with reference to the following description and the appended drawings, wherein like elements are referred to with the same reference numerals. The exemplary embodiment of the present invention describes a system and a method for generating statistical descriptors for a data stream. Although, the present invention will be described with respect to the data stream comprising IP network traffic data, those of skill in the art will understand that the present system and method may be utilized on any n-dimensional data including, but not limited to, financial transactions, sensor data, stock exchange data, telecommunications, web-click streams, weather/environment monitoring, etc.

An exemplary embodiment of a system 2 according to the present invention is shown in FIG. 1. The system 2 includes a computing network 4 connected to a further computing network (e.g., the Internet 6) via a router 8. The network 4 may include wired and/or wireless computing devices such as, for example, mobile units, access points, switches, hubs, databases, servers, etc which communicate on the Internet 6 by transmitting data packets thereto via the router 8. Those of skill in the art will understand that the system 2 may include any number of networks and/or devices interconnected by any number of routers. For example, the router 8 may be a core router linked to further routers or an edge router connecting the network 4 to the Internet 6.

The router 8 generates and stores a flow log which is a record for each connection of a source IP address and a destination IP address and port numbers, as well as data aggregates describing the connection including a number of packets/bytes sent and a duration of the data flow between the addresses. As such, the flow log represents the IP traffic data seen at the router 8 which is an exemplary embodiment of a multidimensional data stream. For example, the IP traffic data may be represented by a plurality of two-dimensional ("2D") fields such as (sourceIPaddress, destinationIPaddress), (#packets, #bytes), (duration, #bytes), etc.

Customers of Internet Service Providers ("ISPs") enter into Service Level Agreements ("SLAs") which describe, for example, a bandwidth guaranteed to the customer, limits on latency in the network, etc. For example, the customer may own the network 4 and contract with the ISP for a portion of bandwidth on the Internet 6. The ISP provides the customer with a quality of service review including summaries of attributes reflecting data flow between the network 4 and the Internet 6. A typical data distribution included in the summary, for example, is a flow size in bytes versus a number of packets of the flow. This data becomes important when diagnosing and responding to, for example, a denial-of-service attack. Conventionally, the summaries are presented as quantile summaries of each attribute alone which only summarize the data in one-dimension 1D using point-based estimators. However, the 1D summaries are insufficient on multidimensional data, because they do not capture correlations/dependencies between attributes. That is, the 1D summaries summarize the distribution of each attribute independently, not jointly.

According to the exemplary embodiments of the present invention, the multidimensional data may be presented as a point descriptor, hereinafter termed "isoquantile." An isoquantile may simultaneously capture the notion of being quantiles in each of the dimensions as well as in a joint distribution. Queries for the isoquantiles may be uniform or biased returning an approximation within predefined error bounds, as will be described further below.

In one dimension, the data stream includes items drawn from a domain of size U, each item being in a range [0 ... U−1]. During operation (i.e., while the system 2 is online), a sample from the data stream may be analyzed. A value N is a number of items observed from the data stream up to a time at which the analysis was initiated. A rank query may be executed on an item x returning a number of items in the sample which are less than or equal to x. The rank query will be denoted by rank(x) below. When the system 2 is online, the data is streaming at such a high rate that to efficiently use the space (i.e., memory) and processing power/time available, an approximation of the rank(x) may be returned. In an offline scenario, however, output of the rank(x) may be more precise. The present invention will be described further with respect to an online scenario, but those of skill in the art will understand that implementation in the offline scenario may be similarly effected.

The approximation of the rank(x), which is termed r(x), is determined during an online rank query. Prior to execution of the rank query, a preselected accuracy guarantee $\epsilon$ is supplied by, for example, the SLA or the network operator. The accuracy guarantee $\epsilon$ provides upper and lower error limits on the value returned upon a query for rank(x).

In one dimension, three types of rank queries may be executed. A uniform rank query determines the r(x) so that the following inequality is satisfied:

$$\text{rank}(x) - \epsilon N \leq r(x) \leq \text{rank}(x) + \epsilon N$$

A fully biased rank query returns the r(x) within the bounds:

$$(1-\epsilon)\text{rank}(x) \leq r(x) \leq (1+\epsilon)\text{rank}(x)$$

A biased rank query returns the r(x) as follows:

Let $t(x,N) = \max\{\epsilon \text{rank}(x), \epsilon_{min} N\}$;

$$\text{rank}(x) - t(x,N) \leq r(x) \leq \text{rank}(x) + t(x,N)$$

As can be seen from the above inequalities, a value being approximated, rank(x), is the same, but a nature of the approximation guarantee $\epsilon$ required differs. The use of bias may provide sharper results for tails of the approximation r(x), which are typically skewed in that they may be asymmetrical about a median of the sample. The biased rank query is a compromise between the fully biased and uniform queries.

A quantile query may also be executed in one-dimension by determining the value x which corresponds to a quantile $\phi$. For example, finding a median of the sample corresponds to querying for a ½ quantile. A binary search is executed on the sample to determine the x which satisfies the quantile query. A uniform quantile query in one-dimension is as follows:

$$(\phi-\epsilon)N \leq \text{rank}(x) \leq (\phi+\epsilon)N$$

A biased quantile query in one-dimensions is:

Let $t(x,N) = \max\{\epsilon \text{rank}(x), \epsilon_{min} N\}$;

$$\phi N - t(x,N) \leq r(x) \leq \phi N + t(x,N)$$

As described above, presenting quantile summaries of one-dimensional data does not truly indicate the quality of service provided to the customer, because the data stream (e.g., IP network traffic data) is multidimensional. That is, the data stream may consist of d-dimensional inputs so that the items are in d-dimensional space with each coordinate of the item being in the range [0 ... U−1]. A d-dimensional sample p has a number of coordinates equal to the number of dimensions. For example, in two-dimensions ("2D"), the sample p consists of x- and y-coordinates denoted $(p_x, p_y)$. Thus, in a 2D rank query, a query point q, $(q_x, q_y)$, is used as input when approximating the rank(q), i.e., the number of points from the sample p such that $p_x \leq q_x$ and $p_y \leq q_y$. Upper bounds for the 2D rank queries are substantially similar to those utilized in the 1D queries with the 2D query point q substituted for the 1D query point x. That is, in a uniform 2D rank query, the error may have an upper bound of $\epsilon N$, whereas the upper bound for a biased 2D rank query is $t(q,N) = \max\{\epsilon \text{rank}(q), \epsilon_{min} N\}$.

Figure 3A:
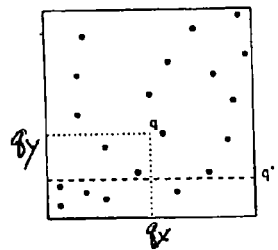
FIG. 3($a$) shows an exemplary embodiment of a sample of a data stream according to the present invention.

An exemplary embodiment of a 2D sample is shown in FIG. 3(a) which is generated as a result of 2D rank queries, rank(q) and rank(q'). As seen in the sample, which includes a total of twenty items (each represented by a point), the rank (q) returns a value of six because there are six items included in an area bounded by the $q_x$ and $q_y$ coordinates of q. The rank(q') returns a value of 5, because, as shown by a horizontal line drawn through q', a number of points dominated in that space is 5.

Those of skill in the art will understand that the quantile may not generalize naturally to multidimensional space, because, unlike in 1D, the notion of rank does not yield a total ordering among points, i.e., points cannot be linearly sorted. For example, given a quantile query for the quantile $\phi$, there may be many points q such that $\text{rank}(q) = \phi N$. In 2D the points satisfying $\text{rank}(q) = \phi N$ form a line, or a "quantour." A description of the quantour includes many points and may not be particular useful to the customer when assessing the quality-of-service provided by ISP.

According to the exemplary embodiments of the present invention, the quantour may be generalized to one or more preselected points on the line satisfying $\text{rank}(q) = \phi N$. A function $\text{rank}_x(q)$ is used to denote the rank of $q_x$ when all points are projected on the x-dimension to produce a 1D data set, and a function $\text{rank}_y(q)$ is used to denote the rank of $q_y$ when all points are projected on the y-dimension to produce a 1D data set. Thus, for any rank $\phi N$, there are at least two points that achieve this rank: a first point at a rightmost side of the sample corresponding to a point whose y-value dominates $\phi N$ of the other points on their y-values and a second point at an uppermost side of the sample corresponding to a point whose x-value dominates $\phi N$ of the other points on their x-values. Essentially, the sample is split into one dimension at a time and a quantile query is performed thereon. Thus, contributions from the x- and y-dimensions are accounted for and balanced.

The contributions from the d-dimensions to the rank φN may be described by using a single statistical descriptor, referred to as an "isoquantile." For example, in determining a 2D isoquantile, a query for the quantile φ is input to identify the point p satisfying rank(p)=φN and $rank_x(p)=rank_y(p)=\theta N$, where θ is a position of the isoquantile. The isoquantile itself is the point $(q_x,q_y)$ having the position θ.

Figure 3B:
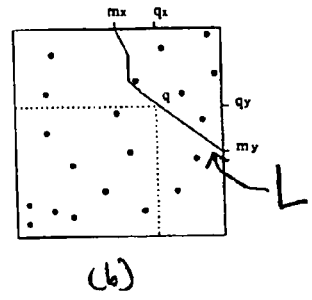

FIG. 3(b) shows an exemplary query for a quantour (quantile φ=½) in the 2D sample p. A point $m_x$ denotes the median on the x-axis, and a point $m_y$ denotes the median on the y-axis. A line L linking the points $m_x$, $m_y$ is an exemplary quantour with rank=φN, in that any point on the line L dominates half of the items. A particular point q on the line L dominates half of the input points and additionally has the same rank (of 13) on each axis. That is, a number of points to the left of q (i.e., along an axis drawn through $q_x$) is 13 and a number of points below q (i.e., along an axis drawn through $q_y$) is 13. As with 1D queries, approximations of the rank(q) in multiple dimensions may be provided based on uniform accuracy guarantees and biased accuracy guarantees.

Generally, the present invention relates to a 1D biased rank query which, when answered, gives a small space, deterministic solution to the 1D biased quantile queries. Then, the 1D data structures returned from the 1D biased quantile queries are used to summarize the 2D data by dividing the data on the x- and y-axes to provide the guaranteed accuracy ε for the isoquantile.

Figure 2:
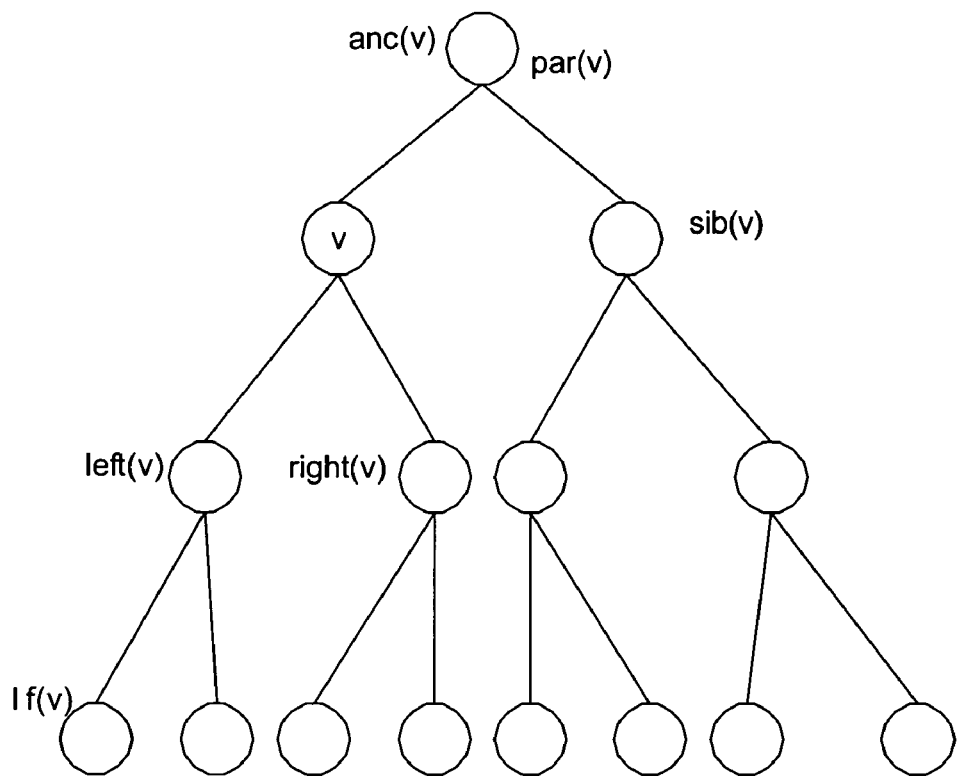
FIG. 2 shows an exemplary embodiment of a data structure according to the present invention.

According to the exemplary embodiments of the present invention, the 1D biased rank query in 1D may be solved in a predetermined space which is sublinear (e.g., logarithmic) in N, U and $1/\epsilon_{min}$. As shown in FIG. 2, a binary tree 300 having a predetermined height (e.g., log U) may be imposed over the domain U in any conventional manner. For a node v in the tree, a function lf(v) denotes a leftmost leaf node in a subtree of v. A function sib(v) denotes a sibling node of v, and a function par(v) denotes a parent node of v. Functions left(v) and right(v) denote left and right child nodes of v, respectively. A function anc(v) returns a set of ancestor nodes of v in the tree.

A biased quantile summary ("bq-summary") is executed for a particular node v and returns a subset of nodes of the tree 300 with an associated count corresponding to a sum of count of items in a subtree covered by the node v. The bq-summary is represented as bq={(v, $c_v$)} consisting of the node v and a corresponding count for that node. The count represents items from the sample that belong to the node v. For example, in the IP network traffic data, an item may belong to the node v when the node v is a source or a destination of the traffic. Thus, given a particular node v, it's rank is at least the sum of all counts of nodes that are to the left of the node v in the subtree, and, at most, this quantity plus the sum of the counts of ancestor nodes of the node v. Therefore, an answer to the 1D biased rank query for node v is bounded by the sum of counts of all ancestor nodes of the node v. The bq-summary uses the nodes to the left of the node v to obtain the L-values, which are an estimate of the rank of the node v.

A function over the tree denoted L(v) may return a count of all left nodes in the subtree from the node v yielding an estimate of the node's rank. The function L(v) may be written as:

$$L(v)=\Sigma_{(w,cw)\in bq, lf(w)<lf(v)} c_w$$

Thus, for any leaf node v, it is ensured that:

$$L(v)-\Sigma_{w\in anc(v)}c_w \leq rank(v) \leq L(v)$$

Accordingly, an accuracy parameter α, which may be less than 1, may be defined for the bq-summary to give guarantees when executing 1D biased quantile queries. Use of the accuracy parameter α may ensure that:

$$\forall (v,c_v)\in bq: v\neq lf(v) \Rightarrow c_v \leq \alpha L(v)$$

$$\forall (v,c_v)\in bq: c_v+c_{sib(v)}+c_{par(v)} \geq \alpha L(par(v))$$

The accuracy parameter α implies that the bq-summary may be generated by initializing the subtree and materializing the leaf nodes and their corresponding counts from the sample. Materializing the leaf nodes approximates absent leaf nodes given what exists of the subtree. The leaf nodes may be materialized when, for example, all ancestor nodes down to the leaf node are filled to a capacity. A compress operation, shown in pseudocode below, may be iteratively applied from the bottom-up over the subtree:

If $c_v+c_{sib(v)}+c_{par(v)}<\alpha L(par(v))$ then
$c_{par(v)} \leftarrow c_{par(v)}+c_v+c_{sib(v)}$;
delete v and sib(v) from bq-summary As understood from the above pseudocode, the compress operation does not decrease a value of L(w) for any node w, but may increase the value L(w) when the count of a right child node v with lf(v)>lf(w) is compressed into the count of par(v), with lf(par(v))<lf(w). In this case, the par(v)∈ anc(w) and the lower bound $L(v)-\Sigma_{w'\in anc(v)}c_{w'}$ remain the same, as a lower bound on the rank of w. Thus, the compress operation may include performing a bottom-up pass and pruning away the unnecessary nodes. The compress operation outputs, for any node v, the sum of all nodes in the subtree of v. Thus, the L(v) may be computed for each node to determine when the node should be pruned. That is, when the sum of the node counts for the node v, the parent node of node v and the sibling node of node v is smaller than αL(par(v)), eliminating/pruning the node v may only incur a small error. When the node v is pruned, its count $c_v$ is added to the count $c_{par(v)}$ of its parent node.

A new item x may be inserted into the tree at a highest level in the tree without breaking the error bounds. For example, assuming the compress operation has just been executed and all internal nodes are at full capacity except for those with no descendants, a closest ancestor node of x is located and its count is incremented by 1. If increasing the count of the ancestor node would cause it to be greater than the upper error bound αL(v), then the ancestor node is not incremented. Instead, left and right child nodes of the ancestor node are materialized with a count of zero and then increment the node which is the new closest ancestor of x (e.g., the child node which matches a prefix of an incoming value—as with IP network traffic data prefixes). The insert operation may be performed iteratively and followed by the compress operation on the tree. After the insert and compress operations, the error bounds may be recomputed.

According to the exemplary embodiments of the present invention, a rankquery operation takes a query item q and estimates its rank (e.g., during a binary search for quantiles). When the L(v) is current (i.e., the compress operation was performed immediately prior), an answer to the rankquery is exactly L(v) where v is a closest ancestor node of q in the tree. To answer a 1D biased quantile query for the quantile φ, a binary search may be performed for the query item q such that rankquery(q) is approximately φN, or the tree may be scanned for a first node v which has L(v)>φN. The answer to the 1D biased quantile query is then an item which immediately precedes the smallest item covered by v.

After the insert and compress operations have been performed on the tree, the set of nodes remaining are such that if a node and one of its non-leaf descendant nodes are materialized, then so are all the intermediate descendant nodes.

Figure 4A:
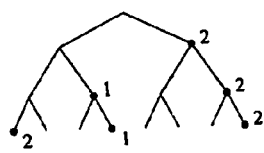
FIG. 4($a$) shows an exemplary embodiment of a one-dimensional data structure according to the present invention.

However, some leaf nodes are retained without their ancestor nodes since the leaf nodes may be heavy while the ancestor nodes are not. FIG. 4(a) shows an exemplary 1D binary tree run on an input set {1,1,3,4,6,7,7,7,8,8} with the accuracy parameter $\alpha=\frac{1}{2}$. Materialized nodes are shown as heavy dots, with their counts indicated. If a node is materialized, then all of its ancestor nodes may be materialized, except, for example, when the leaf node goes above its capacity. The count of a materialized node is initialized to 0, but is incremented whenever new items arrive in the data stream that have a matching prefix with the materialized node. The 1D data in the tree allows the rank query on item 4 to be approximated as being between 2 and 3 (actually, rank(4)=3, since there are 3 items less than it in the input set), and for item 7, the rank is approximated as being between 4 and 8 (actually, rank(7)=5). Thus, 1D biased rank queries and 1D biased quantile queries may be computed in 1D data structures which are then merged.

According to the exemplary embodiments of the present invention, an approach to 1D biased queries may be extended to multiple dimensions, and in particular, to 2D queries. Generally, for d-dimensional queries, multiple copies of 1D algorithms may be cascaded on projections of the d-dimensional data combining output to get bounds on a number of points in the d-dimensional ranges. For example, in 2D data, using an input stream of (x,y)-pairs, a first copy of the 1D algorithm is run on x-dimensional data with the accuracy parameter $\alpha=\epsilon/2 \log U$. For each node which is then materialized in the tree, a second copy of the algorithm is run on y-dimensional data of all points allocated to the materialized node and/or any of its descendant nodes.

Figure 4B:

FIG. 4(b) shows a two-step approach to answering the 2D queries in which a main tree 400 divides the x-values, and each node in the main tree 400 points to a y-sliver 402 corresponding to a range of x values. The present invention defines three exemplary variants on data structures used to track points in the y-slivers, each variant having different attributes (e.g., simplicity, running time and space cost). The y-sliver corresponds to a particular node in the tree. That is, each node in the primary, non-cascaded tree summarizes a corresponding y-sliver.

In one embodiment, a uniform quantile algorithm may be run on each y-sliver 402. Rather than using a number of points within the y-sliver 402 as a threshold for compressing, the threshold is based on N, i.e., the total number of points in the data structure (e.g., the main tree 400). Thus, the error guarantee $\epsilon$ may be in terms of $\epsilon_{min}N$ yielding a tight space bound. Within each of the y-slivers 402, the accuracy parameter $\alpha$ is set to $\epsilon/2 \log^2 U$ and N is used as the threshold. An execution time for the compress operation may be linear with the size of the main tree 400, because it is run on multiple 1D data structures (e.g., each of the y-slivers 402).

In another embodiment, a locally biased algorithm, the 1D biased rank query data structure is used over the points in each y-sliver 402. The threshold for deciding when to split and merge nodes in the data structure may be $\max\{\epsilon_{min}N, \epsilon L(v)\}/2 \log^2 U$. In this case, the value of L(v) is a number of nodes within the current y-sliver that are dominated by a node v. The execution time for the compress operation may be linear with the size of the data structure, because it is run on multiple 1D data structures.

In a further embodiment, a globally biased algorithm, the L(v) is replaced with D(v) which is a number of points strictly dominated by node v (i.e., the number of points that are both to the left and below node v). The globally biased algorithm is performed in two parts. First, linearly scan over the data structure to update the L(v) values of the nodes. Then, repeatedly query each point to compute the D(v) values and execute the compress operation based on those values. When the compress operation is executed in this embodiment, the D(v) values are recalculated. Thus, for each node in each y-sliver 402, the D(v) values globally dominated by the node v and the L(v) values for the number of points dominated within the current sliver (as in the locally biased approach) are retained. For each node during the compress operation, its D(v) value is computed by treating this as a query and running the query routine using the L(v) values. Thus, the D(v) is precisely the result of the query. Provided that the L(v) values are accurate, this query may be computed in time $O(\log^2 U)$. Those of skill in the art will understand that result sharing may optimize the routine further.

For all three approaches (uniform, local and global), answering the query is essentially the same. That is, in order to answer a query for a point q, i.e., $(q_x, q_y)$, a set of nodes in a structure is determined to query by identifying the node v in a fringe which includes the $q_x$. Then, for each node w that is a right child node, its sibling node is added to the set of nodes queried. Union of the ranges of the set will cover a cumulative range $[0 \ldots lf(w)-1]$ with, at most, log U nodes in the set. For each node in the set, the 1D data structure is used on the y-sliver 402 of the node which is also queried with $q_y$. Output of the queries for $q_x$ and $q_y$ is summed to estimate the rank(q).

Figure 4C:
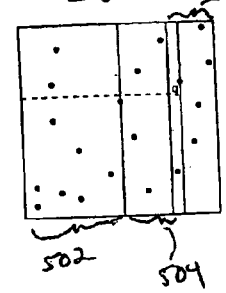

FIG. 4(c) shows the estimation of the rank(q) schematically. For the query $q_x$, three y-slivers have been selected. A first y-sliver 502 covers a first half of a horizontal span and a second y-sliver 504 covers a next quarter of the horizontal span. A third y-sliver 506 covers a last quarter of the horizontal span. Since the set of nodes covers $[0 \ldots lf(w)-1]$, an accurate count of the number of points within this region is provided. The total error is at most $\max\{\epsilon_{min}N, \epsilon rank(v)\}$. The point q shown in FIG. 4(c) is similar to that shown in FIG. 3(b). That is, the point q dominates half of the input and has the same rank (=13) on each axis.

A time to answer each query may be substantially (e.g., asymptotically) similar for each algorithm. That is, the query for the point q is split into a plurality of queries on at most log U y-slivers, each of which can be answered in time $O(\log U)$, giving a total time of $O(\log^2 U)$ per query. And, in terms of space, each approach may have the same space cost, but for typical inputs, the more biased algorithms may attain smaller space costs. For example, the global algorithm may use less space than the local algorithm which uses less space than the uniform algorithm.

The data structures are also used to answer the 2D isoquantile queries. For a query for an isoquantile $\phi$, a search is performed by taking a point p and querying $rank_x(p)$, $rank_y(p)$ and rank(p). These values may be calculated by a double binary search. For example, suppose it is known that for a given isoquantile rank(p)=$\phi N$, there is $rank_x(p)=rank_y(p)=\theta N$. The point p is found by independently locating $p_x$ and $p_y$ using the 1D quantile queries. Thus, the value $\theta$ may be guessed, and the point p is found as a function of the value $\theta$. When the rank(p) is computed and is greater than $\phi N$, then the value $\theta$ was too large, and vice-versa when less than $\phi N$. Therefore, the correct value $\theta$ may be identified using a binary search. There can be at most N values for the value $\theta$ that are distinct. So, there are $O(\log N)$ two-dimensional range queries. Thus, procedure may be generalized to any n-dimension where n>2. That is, the data stream may be split into one-dimension at a time while rescaling the accuracy parameter $\alpha$ to ensure that the accuracy guarantee $\epsilon$ is met.

Figure 5A:
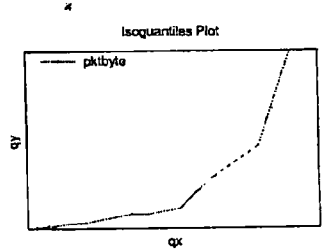
FIG. 5($a$) an exemplary embodiment of an isoquantile plot according to the present invention.

An isoquantile plot displays the points $(q_x, q_y)$ at uniformly spaced $\phi$-values. That is, given the isoquantile $\phi$, the points $q_x$ and $q_y$ both have rank $\theta N$ on their marginals for some $\theta$. A rank correlation plot displays the points $(\phi, \theta)$ at uniformly spaced φ-values. The curves in both plots are monotonically nondecreasing revealing "local" correlation structure between dimensions. For example, FIG. 5(a) shows the isoquantiles for flow data on fields (#packets,#bytes) at φ=i/25 for I=0, . . . , 25. The curve in the isoquantile plot initially increases slowly but ramps up at larger values of $q_x$. This indicates skew in the high y-values relative to the lower values. Hence, the quantile values on y become more spread out. As a result, the correlation between the dimensions is not as strong for large y-values because the x-values cannot "keep up with" the skew in y.

Figure 5B:
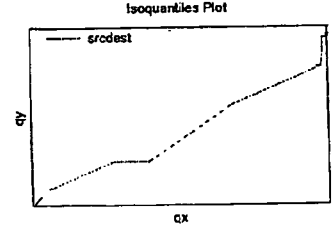

FIG. 5(b) shows the isoquantiles and for flow data on fields (sourceIP, destinationIP) at φ=i/25 for I=0, . . . , 25. The shape of the plot is stacked towards the upper right hand corner indicating a more uniform distribution which is expected, because there is no correlation or anti-correlation between pairs of IP addresses communicating with each other.

The present invention has been described with reference to specific exemplary embodiments. Those skilled in the art will understand that changes may be made in the details of the invention, without departing from the teaching of the invention. Accordingly, various modifications and changes may be made to the embodiments without departing from the broadest scope of the invention as set forth in the claims that follow. The specifications and drawing are, therefore, to be regarded in an illustrative rather than a restrictive sense.

What is claimed is:

1. A computer readable storage medium including a set of instructions executable by a processor, the set of instructions operable to:
   receive a data stream of multi-dimensional items;
   collect a sample of the data stream having a predetermined number of items;
   divide the sample into a plurality of subsamples, each subsample corresponding to a single dimension of each of the predetermined number of items;
   execute a query on a particular item in at least two of the subsamples to generate data for the corresponding subsample; and
   combine the data into a single value.

2. The computer readable storage medium according to claim 1, wherein the query is one of a rank query and a quantile query.

3. The computer readable storage medium according to claim 2, wherein the data is a number of items which are less than the queried item.

4. The computer readable storage medium according to claim 1, wherein the executing step includes the following substeps:
   scaling an accuracy parameter to ensure that the data is within a predetermined accuracy guarantee; and
   generating the data as a function of the particular item and the accuracy parameter.

5. The computer readable storage medium according to claim 4, wherein the instructions are further operable to:
   generate the accuracy guarantee as a function of a type of query.

6. The computer readable storage medium according to claim 5, wherein the type of query is one of a uniform rank query, a uniform quantile query, a biased rank query, a biased quantile query, a fully biased rank query and a fully biased quantile query.

7. The computer readable storage medium according to claim 4, wherein the accuracy guarantee provides upper and lower bounds for the single value.

8. The computer readable storage medium according to claim 1, wherein the items are two-dimensional.

9. The computer readable storage medium according to claim 1, wherein the instructions are further operable to:
   project the single value onto a multidimensional space having a same number of dimensions as the multidimensional items.

10. The computer readable storage medium according to claim 1, wherein the data stream is one of IP network traffic data, financial transaction data, sensor data, stock exchange data, telecommunications data, web-click stream data and environmental monitoring data.

* * * * *